United States Patent [19]
Asada et al.

[11] Patent Number: 5,227,870
[45] Date of Patent: Jul. 13, 1993

[54] DIGITAL PROCESSING COLOR CAMERA USING DIGITAL DELAY LINES AND AN ANALOG ENCODER

[75] Inventors: Ryoji Asada, Hirakata; Shoji Nishikawa, Neyagawa, both of Japan

[73] Assignee: Matsushita Electric Industrial Co., Ltd., Osaka, Japan

[21] Appl. No.: 782,367

[22] Filed: Oct. 24, 1991

[30] Foreign Application Priority Data

Oct. 31, 1990 [JP] Japan .................. 2-295743

[51] Int. Cl.$^5$ .................. H04N 9/04; H04N 9/67; H04N 9/76
[52] U.S. Cl. .................. 358/41; 358/30
[58] Field of Search .................. 358/30, 41, 138

[56] References Cited

U.S. PATENT DOCUMENTS

| | | | |
|---|---|---|---|
| 4,345,270 | 8/1982 | Nagumo et al. | 358/44 |
| 4,599,640 | 7/1986 | Dischert | 358/41 |
| 4,626,898 | 12/1986 | Baba et al. | 358/44 |
| 4,688,085 | 8/1987 | Imaide | 358/30 |
| 4,771,334 | 9/1988 | Bolger | 358/64 |
| 4,792,846 | 12/1988 | Penny | 358/17 |
| 4,987,482 | 1/1991 | Imai et al. | 358/41 |
| 4,998,162 | 3/1991 | Kondo et al. | 358/41 |
| 5,043,803 | 8/1991 | Asaida | 358/41 |
| 5,095,364 | 3/1992 | Asaida et al. | 358/41 |

FOREIGN PATENT DOCUMENTS 068811 1/1983 European Pat. Off. .
61-199391 3/1986 Japan .

OTHER PUBLICATIONS

"A Basic Approach to a Digital Color Camera System", O'Keefe et al., IEEE Transactions on Consumer Electronics, Aug., No. 3, New York, pp. 409–414.

*Primary Examiner*—John K. Peng
*Assistant Examiner*—John W. Miller
*Attorney, Agent, or Firm*—Wenderoth, Lind & Ponack

[57] ABSTRACT

A digital processing color camera includes a matrix circuit for arithmetically processing digital R, G and B video signals, which have been sampled by a clock signal, to provide a digital brightness signal, a first digital color difference signal and a second digital color difference signal. Those signals are subsequently converted by associated digital-to-analog converters into an analog brightness signal, a first analog color difference signal and a second analog color difference signal. Both the brightness signal and the first color difference signal, are delayed a predetermined period of time by digital delay lines inserted between the matrix circuit and the digital-to-analog converter circuit.

3 Claims, 5 Drawing Sheets

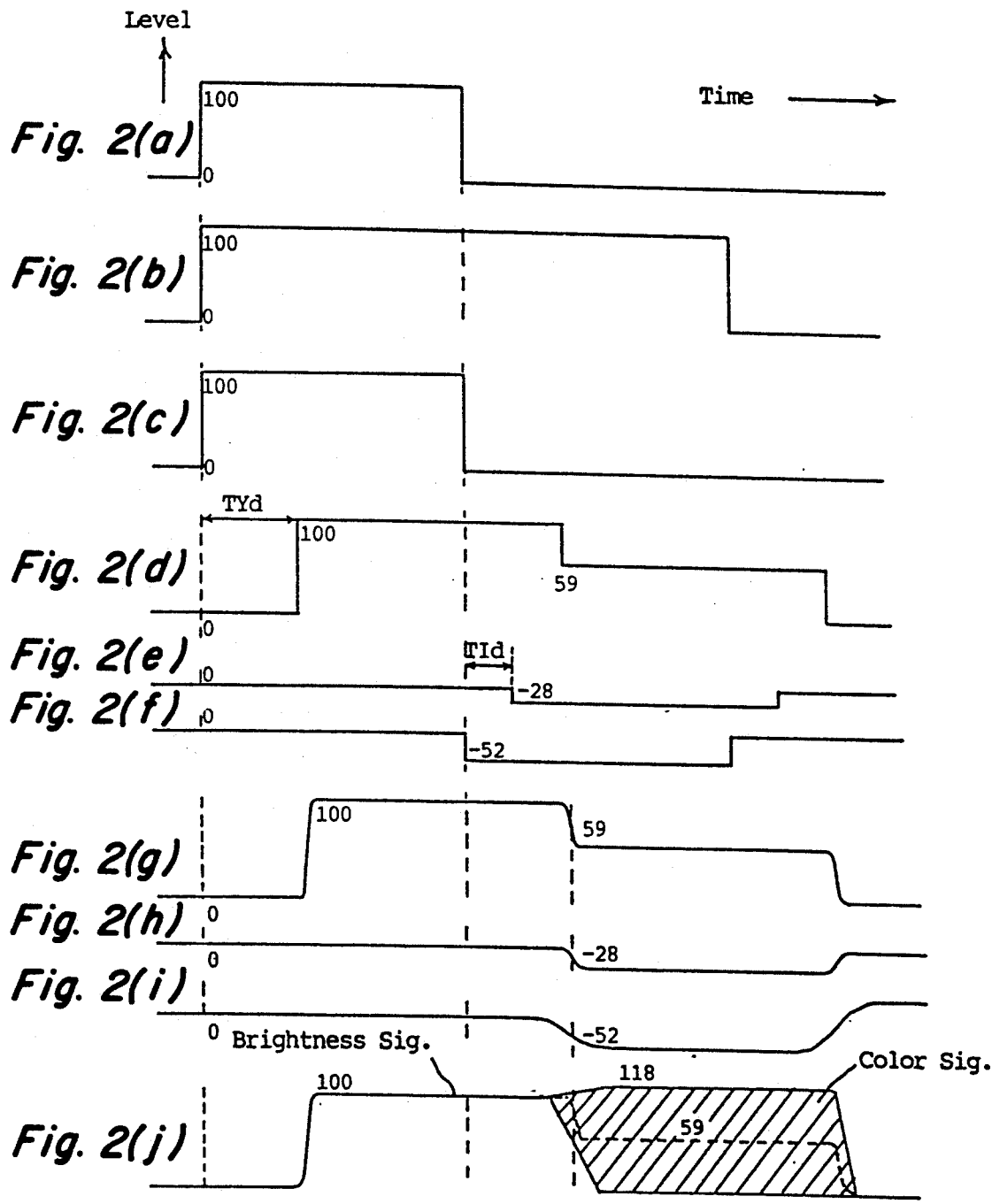

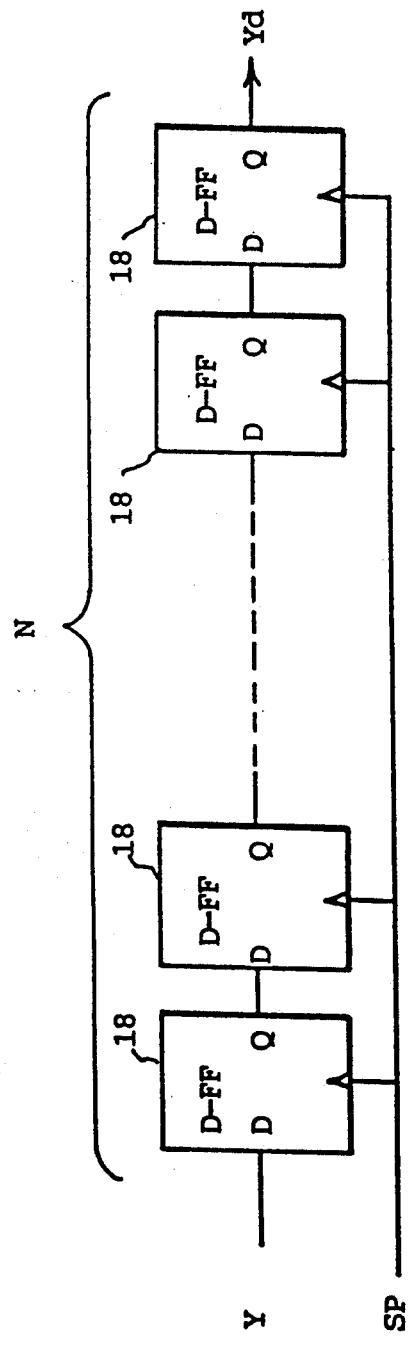
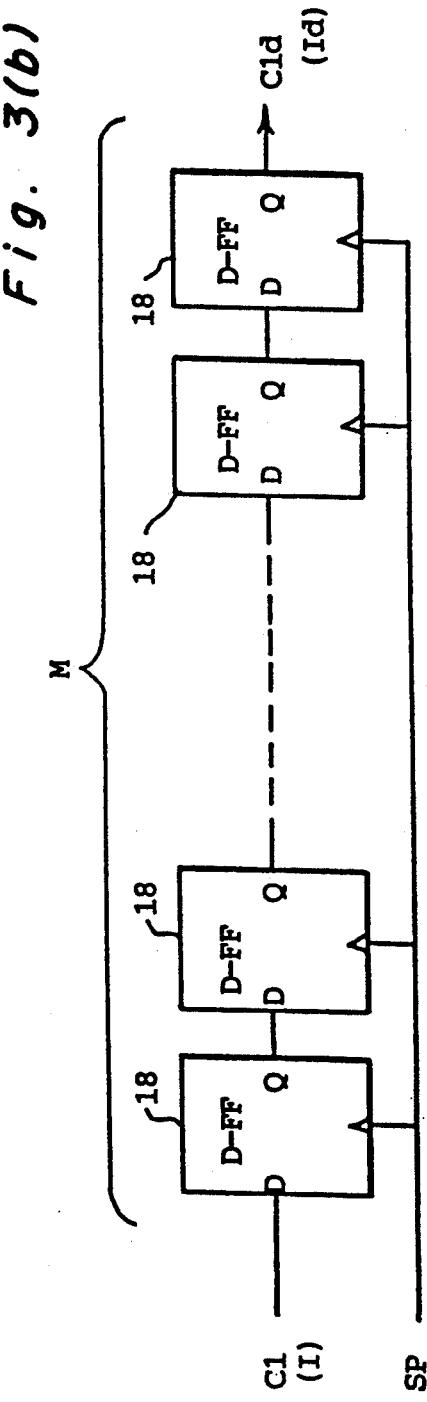

DIGITAL PROCESSING COLOR CAMERA USING DIGITAL DELAY LINES AND AN ANALOG ENCODER

BACKGROUND OF THE INVENTION

1. Field of the Invention

The present invention generally relates to a television camera and, more particularly, to a digital processing color TV camera having digitized signal processing units.

2. Description of the Prior Art

A solid-state camera utilizing a solid-state imaging element which is compact and light-weight, and has a low power consumption and is highly reliable is today largely used as a color television camera not only in the television broadcasting industry, but also in homes. Particularly in the field of the television broadcasting industry, demands for a digital color camera are increasing because improvements in reliability, handling capacity and quality of images can readily be accomplished and also because it can readily be connected with other equipment which have been digitized.

One example of such prior art digital color cameras comprises a processing circuit for effecting black-balance, white-balance and gamma corrections, a Y color difference matrix circuit for providing a brightness signal and a color difference signal, low pass filters for limiting bands, delay lines for time adjustment and an encoder circuit for effecting a quadrature two-phase amplitude modulation of two color difference signals and combining them with the brightness signal.

Assuming that three primary colors of red, green and blue contained in a video signal are expressed by R, G and B, respectively, the brightness signal Y can be expressed by the following equation.

$$Y = 0.30R + 0.59G + 0.11B$$

The two color difference signals, denoted I and Q signals, respectively, can be expressed by the following respective equations.

$$I = 0.60R - 0.28G - 0.32B$$

$$Q = 0.21R - 0.52G + 0.31B$$

An NTSC output signal which is a standard television system is generally processed in the following manner by a color encoder to combine R, G and B sync signals so as to thereby provide a single signal (NTSC) signal.

The two color difference signals, that is, the I and Q signals, emerging from the Y color difference circuit have their respective bands restricted according to the NTSC standards to 1.5 MHz and 0.5 MHz, respectively. Specifically, the I signal must have such frequency characteristics that (1) the amount of the I signal attenuated at 3 MHz is smaller than 2 dB and (2) the amount of the I signal attenuated at 6 MHz is greater than 20 dB. On the other hand, the Q signal must have such frequency characteristics that (1) the amount of the Q signal attenuated at 0.4 MHz is smaller than 2 dB, (2) the amount of the Q signal attenuated at 0.5 MHz is smaller than 6 dB and (3) the amount of the Q signal attenuated at 0.6 MHz is greater than 6 dB.

Thus, as compared with the I signal, the Q signal is subjected to a steep band restriction. Therefore, if the band restriction is carried out by the use of a low-pass filter of a simple construction having few stages, the phase characteristic tends to be deteriorated and ringing such as overshoot and undershoot tends to occur. Conversely, if a low-pass filter of a complicated construction having an increased number of stages is employed, a favorable phase characteristic can be attained, but a problem tends to occur in that a delay time increases.

In view of the foregoing, the use has been made of a low-pass filter in which an induction m-type is combined with a window trap for providing a phase characteristic and a steep cut-off characteristic. However, the use of such low-pass filter tends to increase a delay time undesirably.

Thus, since the respective bands of the I and Q signals are restricted to 1.5 and 0.5 MHz, respectively, by means of the low-pass filter, the Q and I signals tend to be delayed about 2.35 $\mu$sec. and about 0.18 $\mu$sec., respectively, as compared with the brightness signal Y.

In order to compensate for those delay times, delay lines are employed to compensate for a difference between the delay time of the Q signal and that of any one of the brightness signal and the I signal, so as to thereby equalize the delay times of the brightness signal Y, the I signal and the Q signal.

The delay time added to the brightness signal Y and the delay time added to the I signal are 1.4 $\mu$sec. and about 1.2 $\mu$sec., respectively.

It is, however, to be noted that the brightness signal Y as well has its band restricted by a low-pass filter to 6 MHz as a transmission bandwidth. Therefore, if a delay time attributable to this low-pass filter and any other processing such as an aperture correction is added, the delay time thereof can be subtracted, but the brightness signal Y is generally given a delay time of about 1 $\mu$sec. (See, "NHK Terebi Gijutsu Kyokasho (Jou)" (NHK TV Technical Text), pages 17 to 19, published by Nippon Hoso Kyoukai, Apr. 10, 1989.)

The I and Q signals to which the respective delay times have been added in the manner described above are supplied to a quadrature two-phase amplitude modulator in which they are combined together with no cross-talk to provide a single color signal. This color signal is subsequently added to the brightness signal having the delay time adjusted by means of the delay line, so as to thereby provide an NTSC output signal.

Since the circuitry so constructed as described hereinabove is an analog circuit, the delay line to be inserted in each of the brightness signal and the I signal is employed in the form of a delay circuit having a concentrated constant such as, for example, a resistor, a capacitor or a coil, for example, a delay circuit of induction m-type capable of exhibiting a linear phase characteristic, or a delay cable.

Accordingly, the phase characteristic and the amplitude characteristic tend to be adversely affected as a result of a change in temperature and/or a change with time and, therefore, the image quality tends to be adversely affected considerably. Where the delay cable is employed, a reflection of a high frequency occurs, thereby adversely affecting the image quality.

In order to suppress the reduction in characteristic resulting from the change with time, it is a recent trend to digitize the camera. Although the camera wherein both of a signal processing circuit and an encoder are digitized is today available (See, "Signal Processing LSI for Totally Digitalized Color Camera", Technical Report of the Society of Television, 1984 Vol. 8, No. 3, pages 27 to 32.), a digital camera wherein only the signal processing circuit is digitized to reduce power consumption while an analog encoder is employed is rather widely used and, therefore, the use of the analog delay line cannot be avoided, failing to make best use of the digital features.

SUMMARY OF THE INVENTION

The present invention is intended to provide a digital processing color camera wherein, even if an analog encoder is employed for an encoding circuit, a high quality television signal can be obtained without both the phase characteristic and the amplitude characteristic being adversely affected.

In order to accomplish the foregoing object, the digital processing color camera according to the present invention comprises a matrix circuit for arithmetically processing digital R, G and B video signals, which have been sampled by a clock signal, to provide a digital brightness signal, a first digital color difference signal and a second digital color difference signal; a a brightness signal delay circuit for delaying the digital brightness signal outputted from the matrix circuit; a color difference signal delay circuit for delaying the first digital color difference signal outputted from the matrix circuit; a digital-to-analog converter for converting the digital brightness signal, the first digital color difference signal and the second digital color difference signal into an analog brightness signal, a first analog color difference signal and a second analog color difference signal, respectively; a low-pass filter for imposing a predetermined band restriction on the analog brightness, first and second analog color difference signals so as to thereby provide a band-restricted brightness signal, a first band-restricted color difference signal and a second band-restricted color difference signal, respectively; a quadrature two-phase amplitude modulator for modulating the first and second band-restricted color difference signals to provide a color signal; and a synthesizer circuit for combining the band-restricted brightness signal and the color signal to provide a composite video signal.

Preferably, each of the brightness delay circuit and the color difference delay circuit employed in the digital processing color camera of the present invention is employed in the form of an adjustable delay line capable of selecting one of a plurality of delay times each being equal to N/2 times the cycle of a clock signal, wherein N represents a positive integer.

According to the present invention, the matrix circuit processes the digital R, G and B image video signals descriptive of red, green and blue images, respectively, to provide the brightness signal and the first and second color difference signals. Where the respective bands of the first and second color difference signals are equally restricted such as practiced in the PAL scheme, brightness signal is delayed a predetermined time by the digital delay line. However, where they are restricted differently such as practiced in the NTSC scheme, both of the brightness signal and the first color difference signal are delayed a predetermined time by the digital delay line. By the provision of these digital delay lines, the delay incurred by the second color difference signal in the encoder can be substantially matched with the delay time by which both of the brightness signal and the first color difference signals are delayed. After the foregoing digital processing, the brightness signal and the first and second color difference signals are converted by the digital-to-analog converter into the respective analog signals. Each of the analog brightness signal and the first and second analog color difference signals are then restricted in band by respective low-pass filters, and the band-restricted first and second color signals are subsequently modulated by the quadrature two-phase amplitude modulator to provide a color signal. This color signal is then combined by the synthesizer circuit with the band-restricted brightness signal thereby to provide a composite video signal.

Also, the delay circuit is capable of selecting one of a plurality of delay times each being equal to N/2 times the cycle of a clock signal, wherein N represents a positive integer, so that it can cope accurately with a difference in delay time resulting from a difference in band-restricting characteristic of the color difference signals.

BRIEF DESCRIPTION OF THE DRAWINGS

This and other objects and features of the present invention will become clear from the following description taken in conjunction with a preferred embodiment of the present invention with reference to the accompanying drawings, in which:

FIGS. 2(a)–2(j) are timing charts showing various waveforms of signals appearing in respective circuit components of the digital color camera, it being to be noted that FIG. 2(a) to 2(j) respectively correspond to points (a) to (j) on the signal lines shown in FIG. 1;

FIGS. 3(a) and 3(b) are block diagrams showing different internal arrangements of one embodiment of a delay line used in the digital color camera.

DETAILED DESCRIPTION OF THE EMBODIMENT

Figure 1:
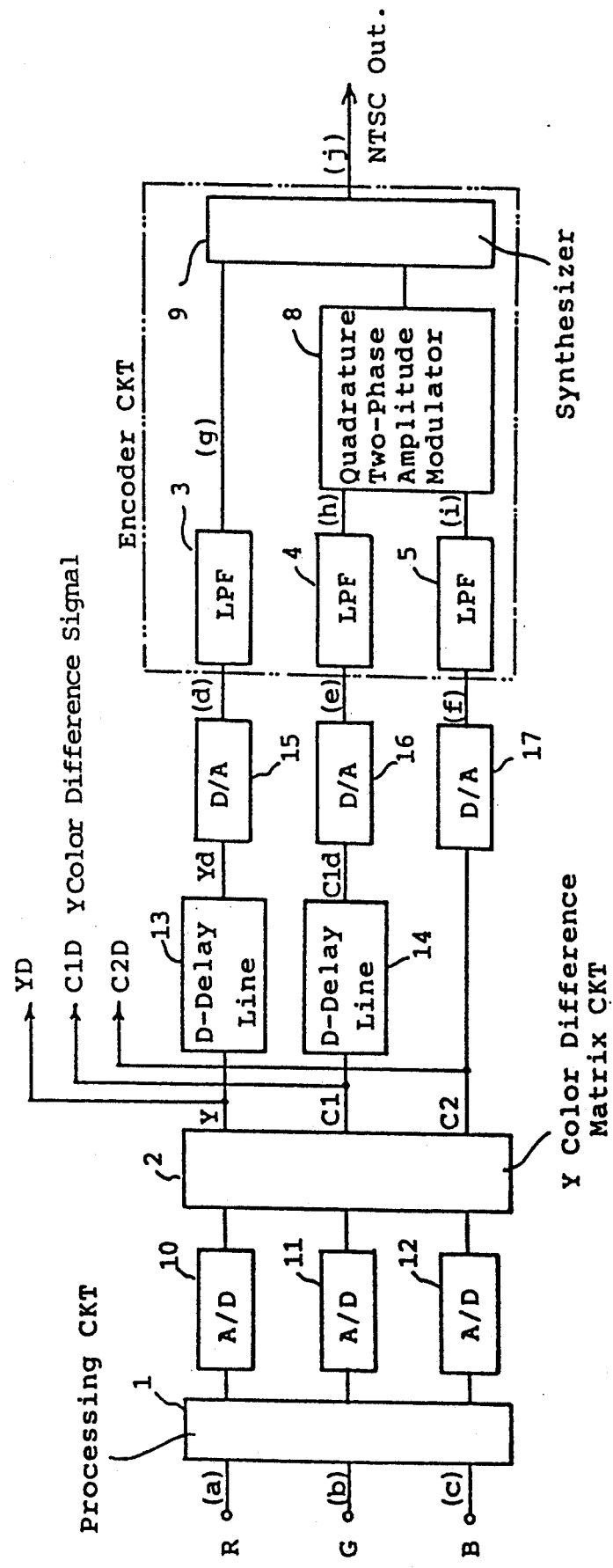
FIG. 1 is a block diagram processing of a digital color camera embodying the present invention.

With reference to FIG. 1, a digital processing color camera embodying the present invention comprises a processing circuit 1 for effecting black-balance, white-balance and gamma corrections to R, G and B color video signals, respective waveforms thereof being shown in FIGS. 2(a), 2(b) and 2(c) a Y color difference matrix circuit 2 for synthesizing a brightness signal Y and color difference signals C1 and C2, and analog-to-digital converters 10 inserted between the processing circuit 1 and the matrix circuit 2 for converting the R, G and B color video signals into respective digital signals. Reference numeral 3 represents a low-pass filter for the brightness signal and reference numerals 4 and 5 represent respective low-pass filters for the color difference signals. The low-pass filter 3 is connected directly to a synthesizer circuit 9 operable to combining the brightness signal and the color difference signal together and the low-pass filters 4 and 5 are connected to the synthesize circuit 9 through a quadrature two-phase amplitude modulator 8 for converting the two color difference signals into a single signal.

Reference numeral 13 represents a brightness signal delay circuit for delaying the brightness signal Y for a predetermined delay time, reference numeral 14 represents a color difference signal delay circuit for delaying the first color difference signal C1 for a predetermined time, and reference numerals 15, 16 and 17 represent digital-to-analog converters for converting the digital signals into respective analog signals.

The low-pass filters 3, 4 and 5 and the quadrature two-phase amplitude modulator 8 altogether constitute an analog encoder comprised of the analog circuits.

Thus, the illustrated embodiment of the present invention represents a digital processing color camera wherein the encoder is constituted by analog circuits.

The operation of the digital processing color camera embodying the present invention will now be described with particular reference to FIGS. 2 to 4.

FIGS. 2(a) to (j) shown waveforms of signals appearing at respective points (a) to (j) in the circuit shown in FIG. 1.

Figure 4A:
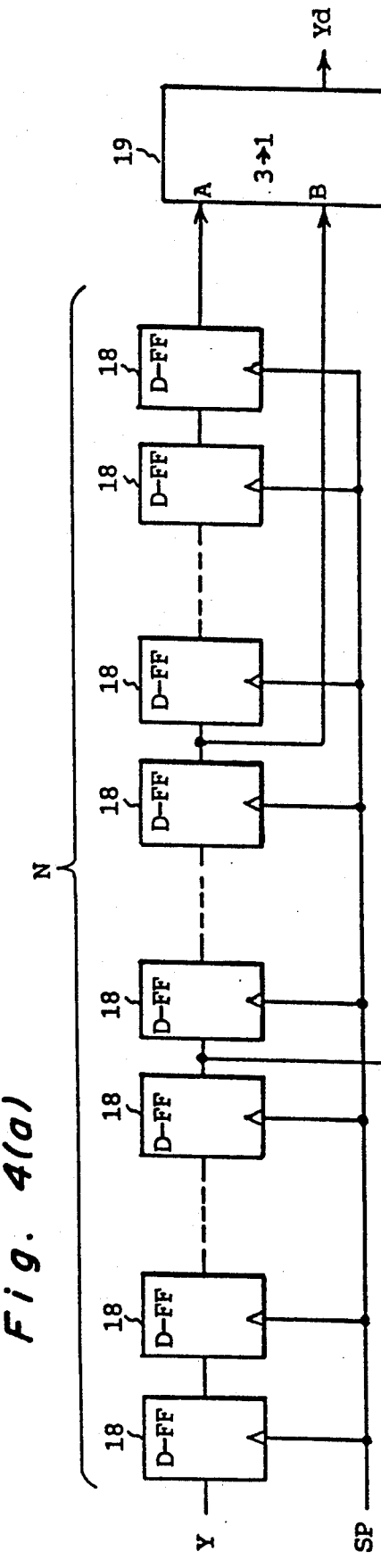
FIGS. 4(a) and 4(b) are block diagrams showing different internal arrangements of another embodiment of the delay line.
Figure 4B:
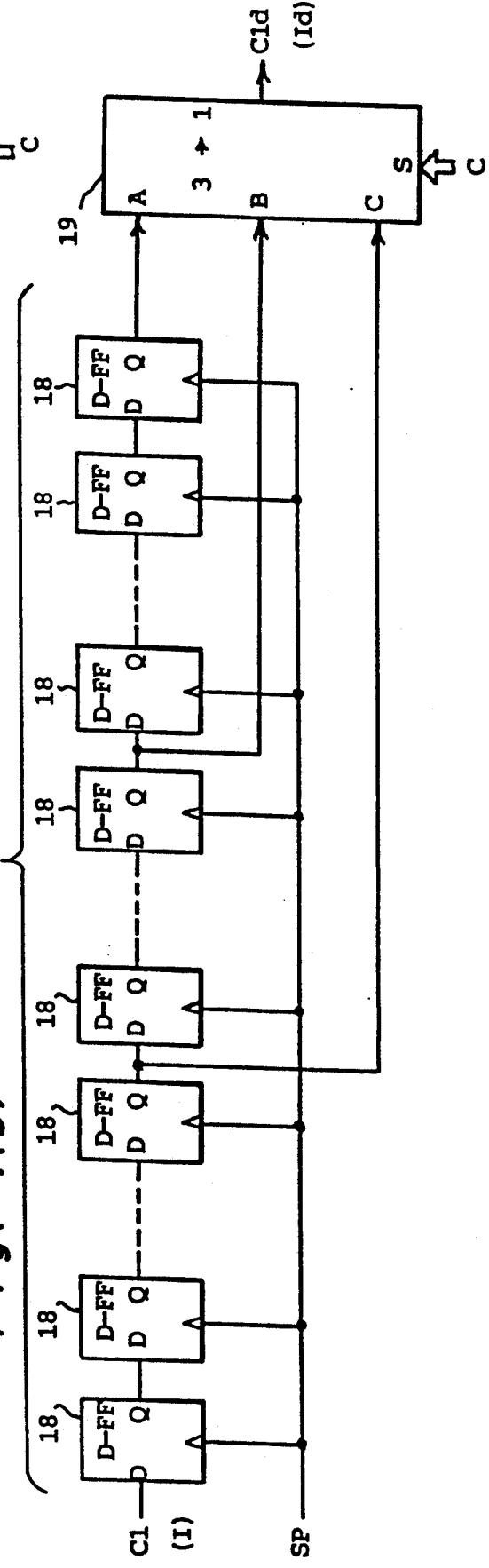

FIGS. 3(a) and 3(b) show respective examples of an internal structure of the brightness signal delay circuit 3 while FIGS. 4(a) and 4(b) show respective examples of an internal structure of the color difference signal delay circuit 14, wherein reference numeral 18 represents a delay flip-flop and reference numeral 19 represents a data selector.

After the R, G and B color video signals have been subjected by the processing circuit 1 to the black level adjustment, the white level adjustment and the gamma correction, the R, G and B color video signals are converted by the associated analog-to-digital converters 10, 11 and 12 into the respective digital video signals, each having a predetermined number, for example, eight bits, in synchronism with a predetermined sampling clock.

The digital R, G and B color video signals emerging from the associated converters 10 to 12 are supplied to the Y color difference matrix circuit 2 from which the brightness signal Y and the first and second color difference signals C1 and C2 emerge.

Assuming that the first and second color difference signals C1 and C2 are represented by the I and Q signals, respectively, each of the brightness signal Y and the I signal, that is, the first color difference signal, must be delayed a predetermined period of time which is enough to compensate for a delay time of the Q signal (the second color difference signal C2) caused by the low-pass filter 5. In the illustrated embodiment, the digital delay circuits 13 and 14 are employed to accomplish a delay of the brightness signal Y and the first color difference signal C1. This will now be described in detail.

Assuming that the R, G and B color video signals applied to the processing circuit 1 have the respective waveforms shown in FIGS. 2(a), 2(b) and 2(c) and after they have been processed by the processing circuit 1 and then by the Y color difference matrix circuit 2, the digital-to-analog converters 15 and 16 output the brightness signal delayed a predetermined time TYd by the digital delay circuit 13 (the waveform of which is shown in FIG. 2(d)) and the I signal delayed a predetermined time TId by the digital delay line 14 (the waveform of which is shown in FIG. 2(e), respectively. On the other hand, the digital-to-analog converter 17 outputs the Q signal which is not delayed, the waveform of which is shown in FIG. 2(f).

Thereafter, the brightness signal is supplied to the low-pass filter 3 by which the band thereof is restricted to represent such a waveform as shown in FIG. 2(g) and, similarly, the I and Q signals are supplied to the associated low-pass filters 4 and 5 by which the corresponding bands thereof are restricted to represent such waveforms as shown in FIGS. 2(h) and 2(i), respectively. At this time, the brightness signal and the I and Q signals are brought in an equally timed relationship with each other.

In other words, the delay times TYd and TId, both shown in FIG. 2, are so chosen and so fixed that, by adding to the brightness signal a sum of the delay time TYd and the delay time of the low-pass filter associated with the brightness signal and also by adding to the I signal a sum of the delay time TID and the delay time of the low-pass filter associated with the I signal, both of the brightness signal and the I signal are synchronized with the delay time of the Q signal. The selection of the respective delay times required to accomplish the foregoing synchronization is accomplished by the use of the digital brightness signal delay circuit 13 and the color difference delay circuit 14. If a delay time of the quadrature two-phase amplitude modulator 8 is neglected, the synthesizing circuit 9 modulates the brightness signal and the I and Q signals, which have been matched in timing with each other, thereby to synthesize a color signal having a waveform shown in FIG. 2(j), which is utilized as a composite video signal (NTSC signal). It is to be noted that, in the waveform shown in FIG. 2(j) a hatched area represents a modulated color signal.

The details of the digital delay circuits 13 and 14 will now be described with particular reference to FIGS. 3(a)–3(b) and 4(a)–4(b) respectively.

In the example shown in FIGS. 3(a) and 3(b), the delay circuit 13 associated with the brightness signal Y comprises a delay circuit having N delay flip-flops and the delay circuit 14 associated with the first color difference signal C1 (the I signal) comprises a delay circuit having M delay flip-flops.

Thus, when the clock to be applied to the delay flip-flops is the same as the clock applied to the analog-to-digital converters, the brightness signal Y can be delayed a predetermined period of time which is N times the cycle of sampling clocks SP applied to the analog-to-digital converters 10, 11 and 12, and the first color difference signal C1 (the I signal) can be delayed a predetermined period of time which is M times the cycle of sampling clocks SP applied to the analog-to-digital converters 10, 11 and 12. It is to be noted that N and M are each positive integers. Thus, in the illustrated embodiment, $TYd = N \times t$ and $TId = M \times t$.

In the practice of the present invention, by properly selecting a particular value for each of the parameters N and M, the predetermined delay time can be obtained and, due to the digital signal, no deterioration in phase and amplitude characteristics which would otherwise occur as a result of a change in temperature and/or a change with time occurs.

FIGS. 4(a) and 4(b) illustrate alternative delay circuits which can be employed for the delay circuits 13 and 14, respectively. The delay circuit shown in each of FIGS. 4(a) and 4(b) is so designed that one of a plurality of, for example, three, delay times can be selected by a control signal outputted from, for example, a delay time selector switch, which control signal corresponds to a band-restriction of the color signal within the camera. With this arrangement, the delay time can have a freedom of choice. More specifically, assuming that three characteristics are chosen for the low-pass filter used to restrict the band of the second color difference signal C2 (Q signal) and due to a difference in characteristic thereof, an A input of the data selector 19 is selected since the delay time is prolonged in the case of the low-pass filter having a narrow band, or a B input or a C input is selected since the delay time decrease with an increase of the band. Nevertheless, in order for the respective delay times of each of the brightness signal and the first color difference signal C1 (I signal) to match with that of the selected delay time of the filter for the second color difference signal (Q signal), the number of stages of delay flip-flops for the delay time of a signal inputted to each of the A, B and C inputs are determined in consideration of a system of both of the brightness signal and the first color difference signal C1 (I signal).

Thus, according to the present invention, the brightness signal Y and the first color difference signal C1 (the I signal), which have been accurately delayed by the associated digital delay circuits 13 and 14, and the second color difference signal C2 (the Q signal) which has not delayed are converted by the corresponding digital-to-analog converters 15, 16 and 17 into the respective analog signals which are in turn supplied to the associated low-pass filters 3, 4 and 5. During the passage of these signals Y, C1 and C2 through the associated low-pass filters 3, 4 and 5, the respective bands thereof are restricted (It is to be noted that a difference in delay time resulting from the band restriction has been compensated for by the digital delay circuits 13 and 14.), and the two color difference signals C1 and C2 (the I and Q signals) are combined by the quadrature two-phase amplitude modulator 8 to provide a single color signal. Thereafter, this single color signal emerging from the quadrature two-phase amplitude modulator 8 is combined by the synthesizing circuit 9 with the brightness signal to provide the NTSC output signal.

Although the present invention has been described in connection with the preferred embodiment thereof with reference to the accompanying drawings, it is to be noted that various changes and modifications are apparent to those skilled in the art. By way of example, although the analog-to-digital converter 10 to 12 have been described as being inserted between the processing circuit 1 and the Y color difference matrix circuit 2, they may be disposed in a front stage of the processing circuit 1 remote from the matrix circuit 2.

Figure 5:
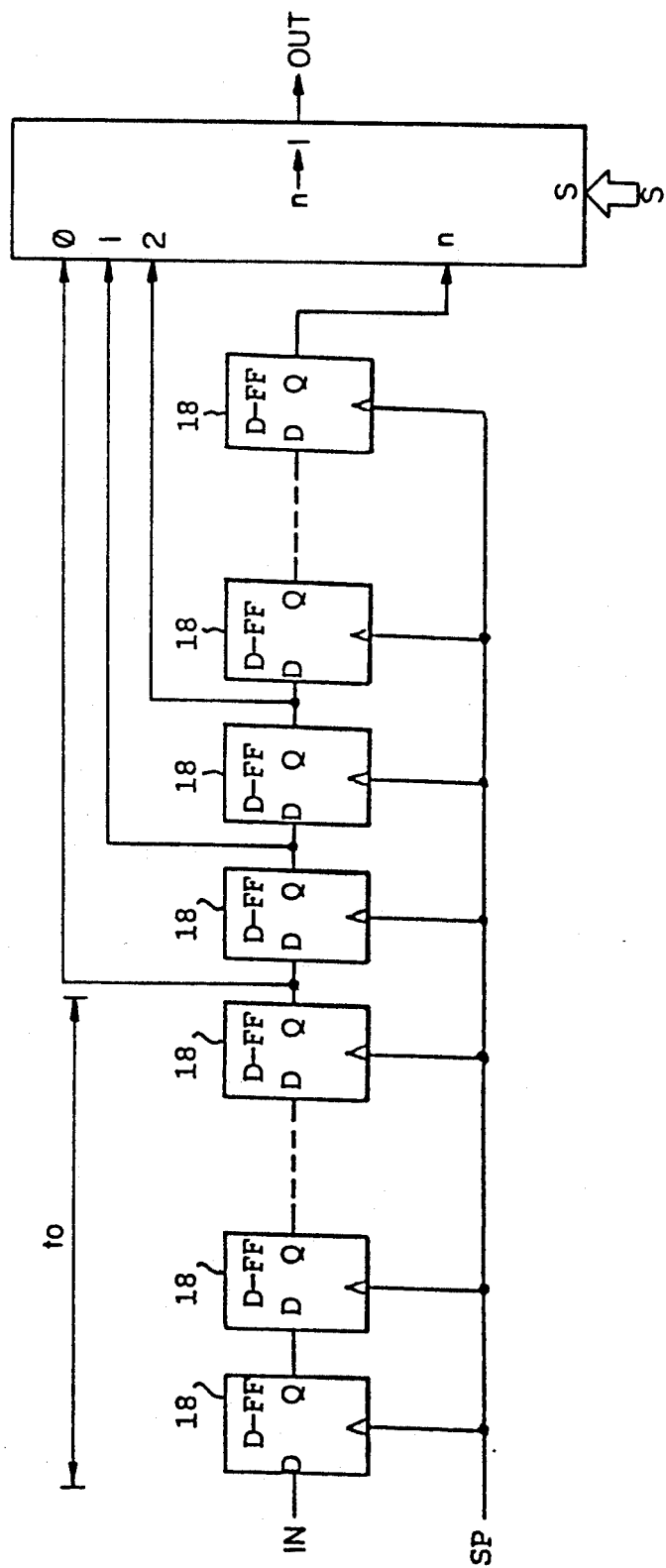
FIG. 5 is a block diagram showing a delay circuit of a type capable of selecting one of a plurality of delay times.

Also, each of the digital delay circuits 13 and 14 may be employed in the form of a memory. For example, the circuit such as shown in FIG. 5 is constructed. Assuming that the clock applied to the delay circuit is a sampling clock of 2 times (2SP), the selection of a select signal S (which is supplied from a delay time selector switch in the camera) makes it possible to select one of arbitrary delay times to, 5/2, 2t/2, 3t/2, . . . , (n−1)/2 and nt/2 at intervals of t/2, wherein t represents the cycle of the sampling clock SP. Similarly, although reference has been made to the use of the color difference signals for the I and Q signals, the system of the present invention can work satisfactorily with R-Y and B-Y signals.

Where the delay circuits 13 and 14 are of the construction shown in FIGS. 4(a) and 4(b), each of the data selectors 19 may be in the form of a switching circuit having a plurality of switching positions equal to the number of delay times that can be selected.

Moreover, if desired for connection with a digital encoder or any other digital equipment, arrangement may be made so that a component digital brightness signal YD and digital color difference signals C1D and C2D can be obtained from the output of the Y color difference matrix circuit 2.

Accordingly, such changes and modifications are to be understood as being included within the scope of the present invention as defined by the appended claims, unless they depart therefrom.

What is claimed is:

1. A digital processing color camera which comprises:
   a matrix circuit for arithmetically processing digital R, G and B video signals, which have been sampled by a clock signal, to provide a digital brightness signal, a first digital color difference signal and a second digital color difference signal;
   a brightness signal delay circuit for delaying the digital brightness signal outputted from the matrix circuit;
   a color difference signal delay circuit for delaying the first digital color difference signal outputted from the matrix circuit;
   a digital-to-analog converter for converting the digital brightness signal, the first digital color difference signal and the second digital color difference signal into an analog brightness signal, a first analog color difference signal and a second analog color difference signal, respectively;
   a low-pass filter for imposing a predetermined band restriction on the analog brightness, first and second analog color difference signals so as to thereby provide a band-restricted brightness signal, a first band-restricted color difference signal and a second band-restricted color difference signal, respectively;
   a quadrature two-phase amplitude modulator for modulating the first and second band-restricted color difference signals to provide a color signal; and
   a synthesizer circuit for combining the band-restricted brightness signal and the color signal to provide a composite video signal.

2. The digital processing color camera as claimed in claim 1, wherein each of said brightness signal delay circuit and the color difference signal delay circuit comprises an adjustable delay line for of selecting one of a plurality of delay times each being equal to N/2 times the cycle of a clock signal, wherein N is a positive integer.

3. A digital processing color camera which comprises:
   a matrix circuit for arithmetically processing digital R, G and B video signals, which have been sampled by a clock signal, to provide a digital brightness signal, a first digital color difference signal and a second digital color difference signal;
   a digital-to-analog converting means for converting the digital brightness signal, the first digital color difference signal and the second digital color difference signal into an analog brightness signal, a first analog color difference signal and a second analog color difference signal, respectively; and
   a digital delay line means inserted between the matrix circuit and the digital-to-analog converter for delaying the brightness signal and the first color difference signal;
   wherein said digital delay line means is an adjustable delay line means capable of selecting one of a plurality of delay times each being equal to N/2 times the cycle of a clock signal, wherein N represents a positive integer.

* * * * *